(No Model.)
S. E. TOMPKINS.
SADDLE TREE.
No. 354,951. Patented Dec. 28, 1886.
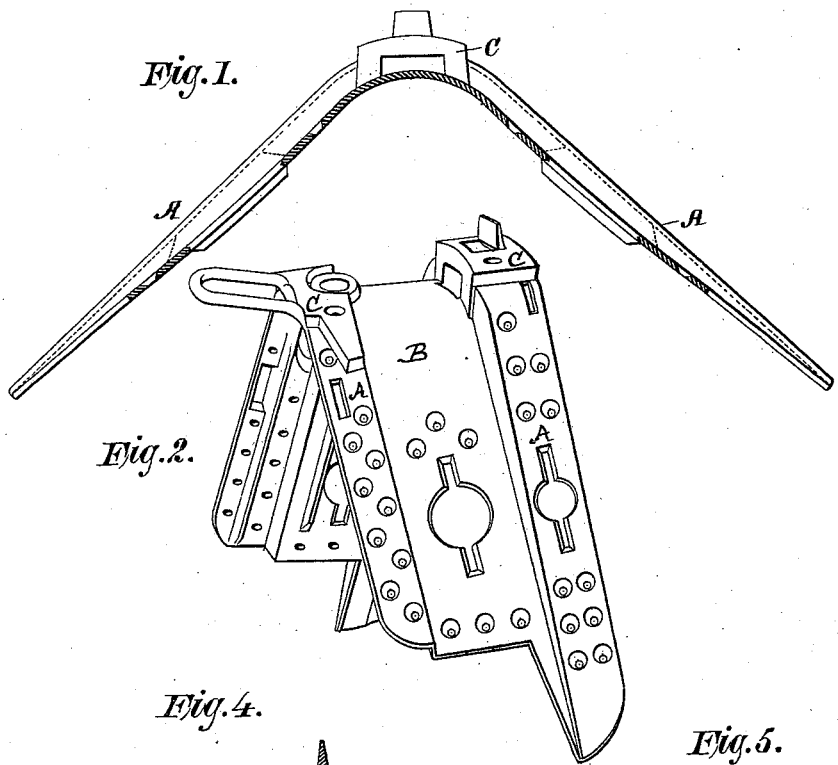
WITNESSES:
Gustave Dieterich
John B. Scarlett
Sam'l E. Tompkins, INVENTOR,
BY J. C. Clayton,
ATTORNEY

UNITED STATES PATENT OFFICE.

SAMUEL E. TOMPKINS, OF NEWARK, NEW JERSEY, ASSIGNOR TO THE RUBBER AND CELLULOID HARNESS TRIMMING COMPANY, OF SAME PLACE.

SADDLE-TREE.

SPECIFICATION forming part of Letters Patent No. 354,951, dated December 28, 1886.

Application filed September 14, 1886. Serial No. 213,537. (No model.)

*To all whom it may concern:*

Be it known that I, SAMUEL E. TOMPKINS, a citizen of the United States, and a resident of Newark, in the county of Essex and State of New Jersey, have invented certain new and useful Improvements in Saddle-Trees, of which the following is a specification.

This invention relates to that class of saddle-trees commonly known as "coupé" trees.

The general form of my improved tree is much like saddle-trees heretofore patented to me, the novel features being the combination of parts hereinafter described, and clearly shown in drawings.

Figure 1 is a longitudinal section through line $x\ x$ of Fig. 3. Fig. 2 is a perspective view. Fig. 3 is a plan of under side. Fig. 4 is a section through line $x'\ x'$ of Fig. 3. Fig. 5 is a section through line $y\ y$ of Fig. 3.

The level side flanges, A A, are provided with nail-holes, as usual.

B is the continuous back-band channel between the elevated flanges A A.

C C are portions at the arch of the tree, raised above the flanges so as to form a suitable platform for the seat and jockey to rest on.

The under surface of the flanges A are provided with ribs $a\ a$ about in the middle line of the flanges, said ribs being cut away at points to accommodate the terrets and pad-screws, &c.

The ribs $a$, in connection with the under surface of the flanges, form cavities in which the stuffing of the tree will settle, and thus be kept from moving to one side.

I claim—

1. A coupé saddle-tree with elevated level flanges provided with ribs $a\ a$ on the under side about half-way between the outer edges and the main body of the tree, as described, for the purpose of forming cavities to receive the stuffing and prevent its moving to one side.

2. A coupé saddle-tree having, in combination, level flanges A A, back-band channel B, raised portions C C, for seat and jockeys to rest on, and the ribs $a\ a$, all constructed and arranged substantially as and for the purposes set forth.

Signed at Newark, in the county of Essex and State of New Jersey, this 10th day of September, A. D. 1886.

SAML. E. TOMPKINS.

Witnesses:
J. C. CLAYTON,
JOHN G. TRUSDELL.